W. E. CULLEY.
SEPARABLE TOOTH SAW.
APPLICATION FILED MAY 3, 1919.
1,308,541.
Patented July 1, 1919.
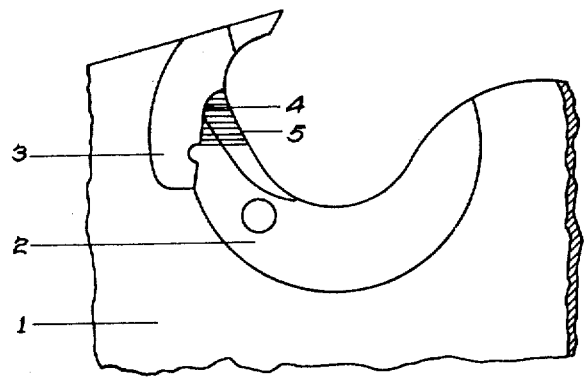
FIG I
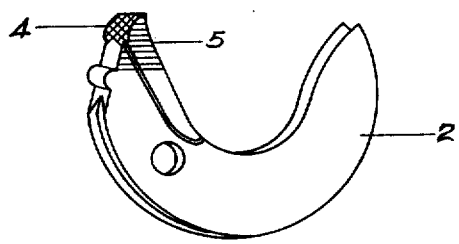
FIG II
INVENTOR

UNITED STATES PATENT OFFICE.

WALTER E. CULLEY, OF FITCHBURG, MASSACHUSETTS, ASSIGNOR TO SIMONDS MANUFACTURING COMPANY, OF FITCHBURG, MASSACHUSETTS, A CORPORATION OF MASSACHUSETTS.

SEPARABLE-TOOTH SAW.

1,308,541.   Specification of Letters Patent.   Patented July 1, 1919.

Application filed May 3, 1919. Serial No. 294,410.

*To all whom it may concern:*

Be it known that I, WALTER E. CULLEY, a citizen of the United States of America, residing at Fitchburg, in the county of Worcester and Commonwealth of Massachusetts, have invented certain Improvements in Separable-Tooth Saws, of which the following is a specification.

This invention relates to saws having separable or inserted teeth and consists in the improved means for holding such teeth securely in place in the saw-plate and preventing any lateral movement between the teeth and the locking plate, as hereinafter described and shown.

In the drawings forming a part of the specification, Figure 1, is a side elevation of a portion of a saw plate with a tooth and the improved locking plate therefor in place in the curved recess in the saw-plate; Fig. 2, is a perspective view of the improved locking plate, with the roughened, hardened portion on the inner surface at the top, to engage the tooth.

Referring to the various portions of the drawings by designating characters, 1, is the saw-plate, 2, the tooth locking or holding plate, 3, the separable tooth, 4, the knurled or roughened portion of the locking-plate at the tip, and 5, the highly tempered or hardened portion, indicated by shading lines.

When the tooth and its locking plate are inserted in place in the saw-plate and forced tightly together, the hardened projections or knurls on the roughened portion of the locking plate will be embedded in the surface of the softer metal of the tooth and thus prevent any lateral movement of the tooth in relation to such plate and thereby obviate the customary objection of having the teeth work loose and frequently fly out of the saw plate. As shown, the roughened portion of the locking plate is on the inner edge at the top, but it is obvious that the roughened portion may be along any portion of the edge which comes to a bearing on the edge of the separable tooth. The roughened part is preferably located at the tip of the ring as it is thus nearer to the cutting point of the tooth where the greatest strain comes.

I claim:

1. In a separable-tooth saw, a locking plate having a portion thereof which bears upon the separable tooth, knurled or roughened and such portion hardened to a high degree, whereby when such plate and tooth are firmly pressed together, the hardened projections will be embedded in the surface of the softer metal of the tooth and thereby prevent relative lateral movement of the parts.

2. In a separable-tooth saw, a clamping bit or plate having its tip or upper end hardened to a high degree and the inner surface thereof roughened, whereby the projecting parts of the roughened surface will engage the softer metal of the tooth when the two are firmly pressed together and thereby prevent lateral movement of the one in relation to the other.

WALTER E. CULLEY.

Copies of this patent may be obtained for five cents each, by addressing the "Commissioner of Patents, Washington, D. C."